(12) United States Patent
Chan et al.

(10) Patent No.: US 7,787,256 B2
(45) Date of Patent: Aug. 31, 2010

(54) TAMPER RESPONDENT SYSTEM

(75) Inventors: Karl Chan, Elkton, MD (US); Brent Lewis, Middletown, DE (US); Harold Wylie, Elkton, MD (US); Dale Murray, Mt. Joy, PA (US)

(73) Assignee: Gore Enterprise Holdings, Inc., Newark, DE (US)

( * ) Notice: Subject to any disclaimer, the term of this patent is extended or adjusted under 35 U.S.C. 154(b) by 155 days.

(21) Appl. No.: 11/836,870

(22) Filed: Aug. 10, 2007

(65) Prior Publication Data

US 2009/0040735 A1 Feb. 12, 2009

(51) Int. Cl.
| | |
|---|---|
| H05K 7/00 | (2006.01) |
| H05K 7/02 | (2006.01) |
| H05K 7/06 | (2006.01) |
| H05K 7/08 | (2006.01) |
| H05K 7/10 | (2006.01) |
| H05K 1/00 | (2006.01) |

(52) U.S. Cl. ..................... 361/760; 174/250
(58) Field of Classification Search ............. 361/760, 361/792; 174/250, 258, 520; 257/788–790
See application file for complete search history.

(56) References Cited

U.S. PATENT DOCUMENTS

| | | | | |
|---|---|---|---|---|
| 3,644,825 | A |  | 2/1972 | Davis, Jr. .................. 324/41 |
| 4,188,549 | A |  | 2/1980 | Dorais ...................... 307/308 |
| 4,325,089 | A |  | 4/1982 | Hsu .......................... 360/15 |
| 4,593,384 | A |  | 6/1986 | Kleijne ..................... 365/228 |
| 5,832,772 | A |  | 11/1998 | McEwan ................... 73/290 |
| 5,858,500 | A | * | 1/1999 | MacPherson .............. 428/68 |
| 5,879,794 | A | * | 3/1999 | Korleski, Jr. ............. 428/317.1 |
| 6,396,400 | B1 | * | 5/2002 | Epstein et al. ............ 340/550 |
| 6,400,268 | B1 |  | 6/2002 | Lindskog ................... 340/550 |
| 6,496,119 | B1 |  | 12/2002 | Otterstedt et al. ......... 340/653 |
| 6,606,123 | B2 |  | 8/2003 | Mizuno ..................... 348/308 |
| 7,247,791 | B2 |  | 7/2007 | Kulpa ........................ 174/50 |
| 7,303,811 | B2 | * | 12/2007 | Yao et al. ................. 428/315.7 |
| 7,346,783 | B1 | * | 3/2008 | Carrico et al. ............. 713/194 |
| 2002/0002683 | A1 |  | 1/2002 | Benson ...................... 361/760 |
| 2002/0084090 | A1 |  | 7/2002 | Farquhar et al. .......... 174/52.4 |
| 2002/0092672 | A1 |  | 7/2002 | Primavera .................. 174/250 |
| 2002/0171439 | A1 |  | 11/2002 | Ono .......................... 324/658 |
| 2006/0049941 | A1 |  | 3/2006 | Hunter ...................... 340/545.6 |
| 2006/0090918 | A1 |  | 5/2006 | Dangler et al. ............ 174/52.2 |
| 2007/0057311 | A1 | * | 3/2007 | Leenders et al. ........... 257/315 |
| 2007/0177363 | A1 | * | 8/2007 | Jayanetti ................... 361/760 |

FOREIGN PATENT DOCUMENTS

DE 197 38 990 A1 3/1999

(Continued)

*Primary Examiner*—Tuan T Dinh
*Assistant Examiner*—Yuriy Semenenko
(74) *Attorney, Agent, or Firm*—Allan M. Wheatcraft

(57) ABSTRACT

A tamper respondent system having: a physical volume containing an electronic device to be protected; an at least partially conductive surface proximate to the electronic device; and a tamper respondent sensor over the electronic device (the sensor comprising: a flexible, dielectric substrate; conductive traces on the substrate; a porous insulating layer having pores over the conductive traces; and adhesive within said pores of said porous insulating layer), wherein the adhesive is in contact with both the substrate and the at least partially conductive surface through the porous insulating layer.

9 Claims, 6 Drawing Sheets

FOREIGN PATENT DOCUMENTS

| | | |
|---|---|---|
| DE | 101 07 611 A1 | 8/2002 |
| EP | 1 462 907 A | 9/2004 |
| FR | 2 801 999 A | 6/2001 |
| GB | 2 220 513 A | 1/1990 |
| GB | 2 256 956 A | 12/1992 |
| GB | 2 256 957 A | 12/1992 |
| GB | 2 256 958 A | 12/1992 |
| GB | 2 258 075 A | 1/1993 |
| GB | 2 270 785 A | 3/1994 |
| GB | 2356 276 | 5/2001 |
| WO | WO 99/21142 | 4/1999 |
| WO | WO 01/59544 A2 | 8/2001 |
| WO | WO 2005/023537 A1 | 3/2005 |
| WO | WO/2005/098950 A1 | 4/2005 |

* cited by examiner

TAMPER RESPONDENT SYSTEM

FIELD OF THE INVENTION

This invention relates to a tamper respondent system, and more particularly, to a tamper respondent sensor adapted for use inside a device.

BACKGROUND OF THE INVENTION

Tamper respondent sensors are utilized in various applications, including the transport of sensitive information and protecting electronic devices. Typical sensors are in the form of envelopes and shallow boxes, the walls of which are formed by folding flexible sheets incorporating tamper detection features. Included in such sensors are layers of flexible material including a matrix of conductive or semi-conductive lines printed on thin insulating film. The matrix of lines forms a continuous conductor which is broken if attempts are made to penetrate the film. The circuit is monitored by opening the conductor at one point and measuring the resistance between the two ends of the circuit. The resistance changes if the circuit is broken, for example because of tampering.

Typically, the sensors are wrapped around the outside of the device to be protected. In many applications, however, the device to be protected is also required to have some form of external ruggedization around it. That is, many electronic devices have an external box or casing that provides strength for transportation or in use. Accordingly, some form of internal tamper respondent sensor is desired.

SUMMARY OF THE INVENTION

The present invention provides a tamper respondent system having: an electronic device to be protected; an at least partially conductive surface proximate to the electronic device; and a tamper respondent sensor over the electronic device (the sensor comprising: a flexible, dielectric substrate; conductive traces on the substrate; a porous insulating layer having pores over the conductive traces; an adhesive within said pores of said porous insulating layer), wherein the adhesive is in contact with both the substrate and the at least partially conductive surface through the porous insulating layer.

Preferably, the at least partially conductive surface is bonded to the tamper respondent sensor by the adhesive, the flexible, dielectric substrate is polyethyleneterephthalate ("PET"), the porous insulating layer comprises spun-bond polyester, and the adhesive comprises a combination of a pressure sensitive adhesive and epoxy. The electronic device includes a Personal Computer Memory Card International Association ("PCMCIA") card or an electrical chassis or box.

DETAILED DESCRIPTION OF THE INVENTION

Figure 1A:
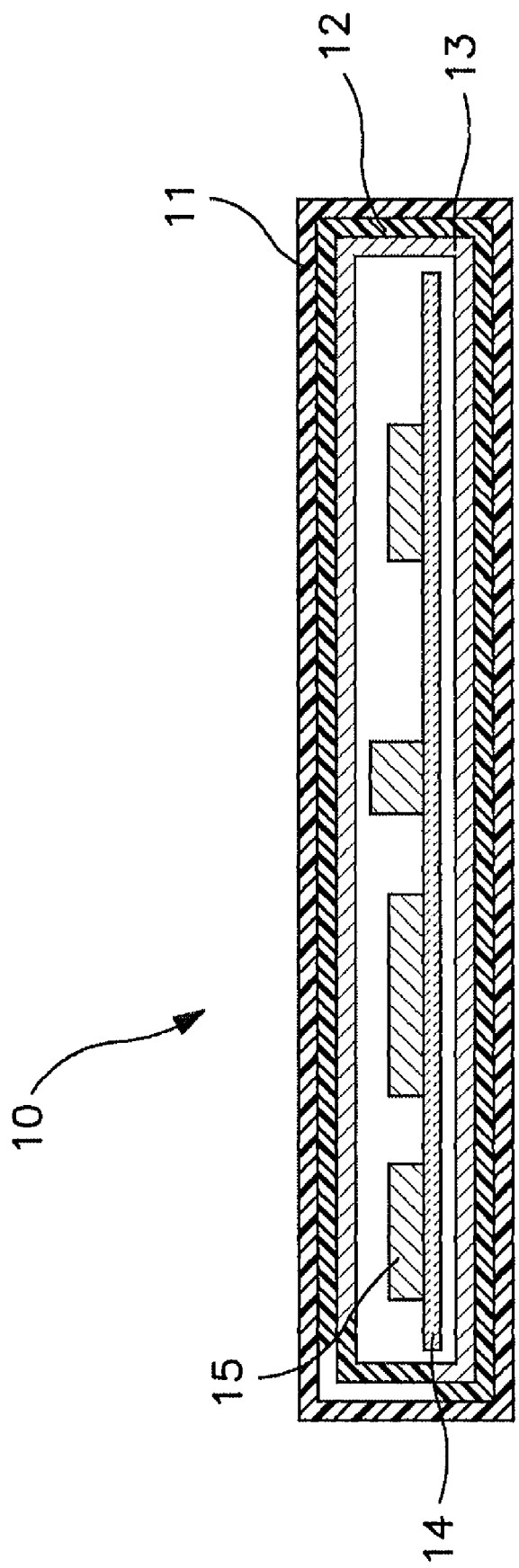
FIG. 1A is a side cross-sectional view of a tamper respondent system according to an exemplary embodiment of the present invention.
Figure 1B:
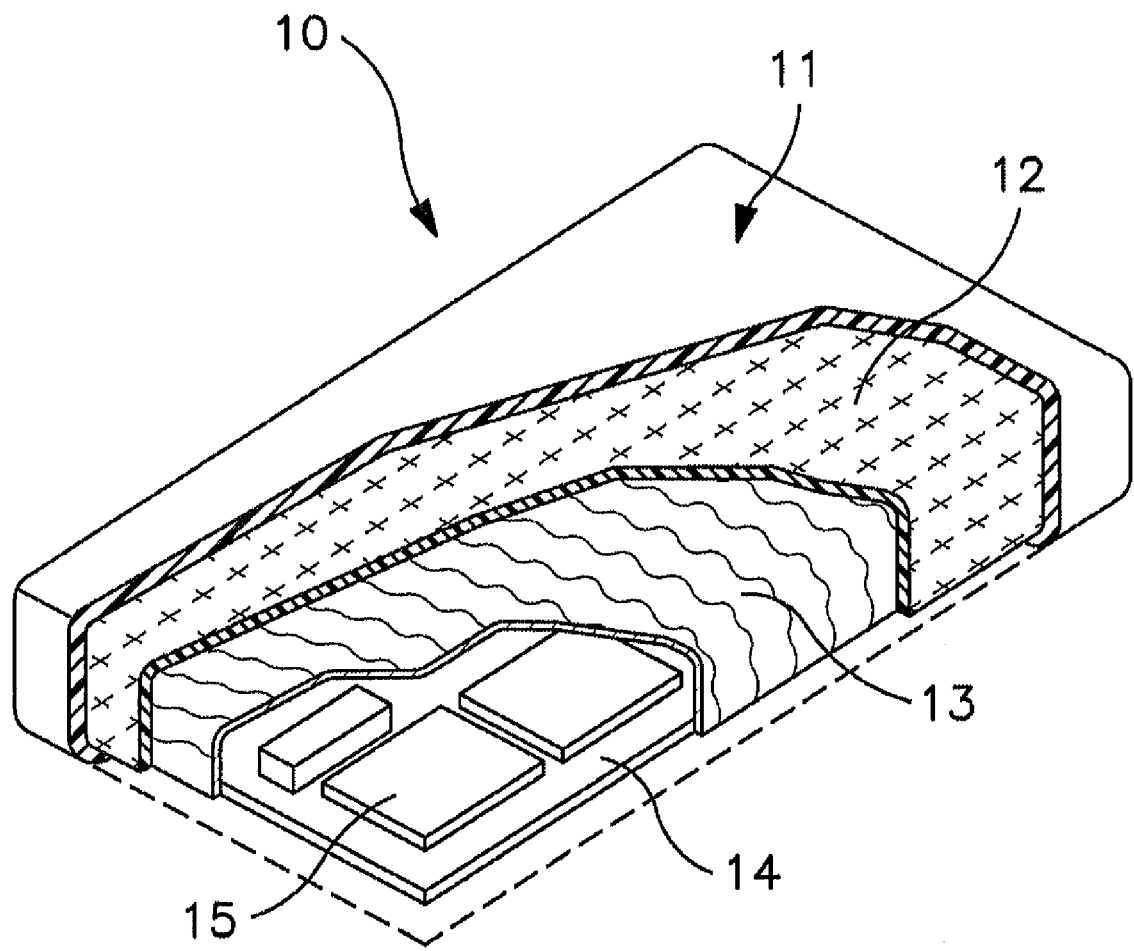
FIG. 1B is a perspective cut-away view of a tamper respondent system according to an exemplary embodiment of the present invention.

Referring to FIGS. 1A and 1B of the drawing, a tamper respondent system 10 will now be described. Tamper respondent system 10 includes a circuit board 14 having components 15 disposed thereon. Components 15 may be electronic devices, some or all of need protection or which contain information to be protected. Disposed on or around circuit board 14 and components 15 is tamper respondent sensor 13. Disposed around tamper respondent sensor 13 is porous insulating layer 12. Porous insulating layer 12 has pores, which are defined herein as openings extending from one side of the insulating layer to the other. A preferred material for porous insulating layer 12 is polyester, most preferably spun-bond polyester. Adhesive (not shown) is disposed within the pores of porous insulating layer 12 such that porous insulating layer 12 is securely attached to both an inside surface of outer reinforcing casing 11 and tamper respondent sensor 13. Preferably, the adhesive is an epoxy on the side of porous insulating layer 12 adjacent the inside surface of outer reinforcing casing 11 and a pressure sensitive adhesive on the side of porous insulating layer 12 adjacent tamper respondent sensor 13. Alternatively, a uniform adhesive of either PSA or epoxy is used. In any event, it is critical that the adhesive extend from the inside surface of outer reinforcing casing 11 to tamper respondent sensor 13 through the pores of porous insulating layer 12.

In use, if there is any breach of reinforcing casing 11, it will destroy or tear the porous insulating layer 12, which is attached by the adhesive to the casing 11, which in turn will tear or breach the tamper respondent sensor 13, also by virtue of the adhesive. Such breach of the tamper respondent sensor 13 triggers an electrical state change that sends an appropriate signal to a monitor circuit (not shown). If this electrical state change occurs then it will erase or destroy any information contained in components 15.

Figure 2:
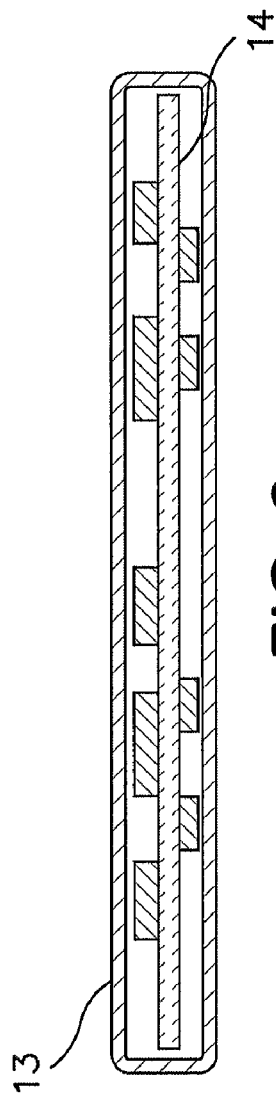
FIG. 2 is a side cross-sectional view of a portion of a tamper respondent system according to an exemplary embodiment of the present invention.

FIG. 2 specifically illustrates circuit board 14 in combination with tamper respondent sensor 13. In one embodiment tamper, respondent sensor 13 is wrapped around circuit board 14 without a separate box or enclosure around circuit board 14. If necessary in this embodiment, a filler may be used to form a surface over the circuit board to which tamper respondent sensor 13 adheres. Alternatively, a separate box or enclosure may first be disposed around circuit board 14.

Circuit board contains certain components 15 to be protected. Components 15 may include wireless transmitters. A particular arrangement of exemplary components involves components that carry security sensitive information in an encryption module, access to the information stored in the module requiring use of a variable key, the nature of the key required being stored in a memory. As will be described, tamper respondent system 10 is arranged to detect attempts to tamper with or penetrate it. Components 15 thus also include an enclosure monitor circuit which, if tampering is detected, activates a protective action, such as, for example, an erase circuit to erase the information stored in the memory and encryption module. These components 15 are mounted on and interconnected by printed circuit board 14, power being provided by, for example, a battery.

Figure 3:
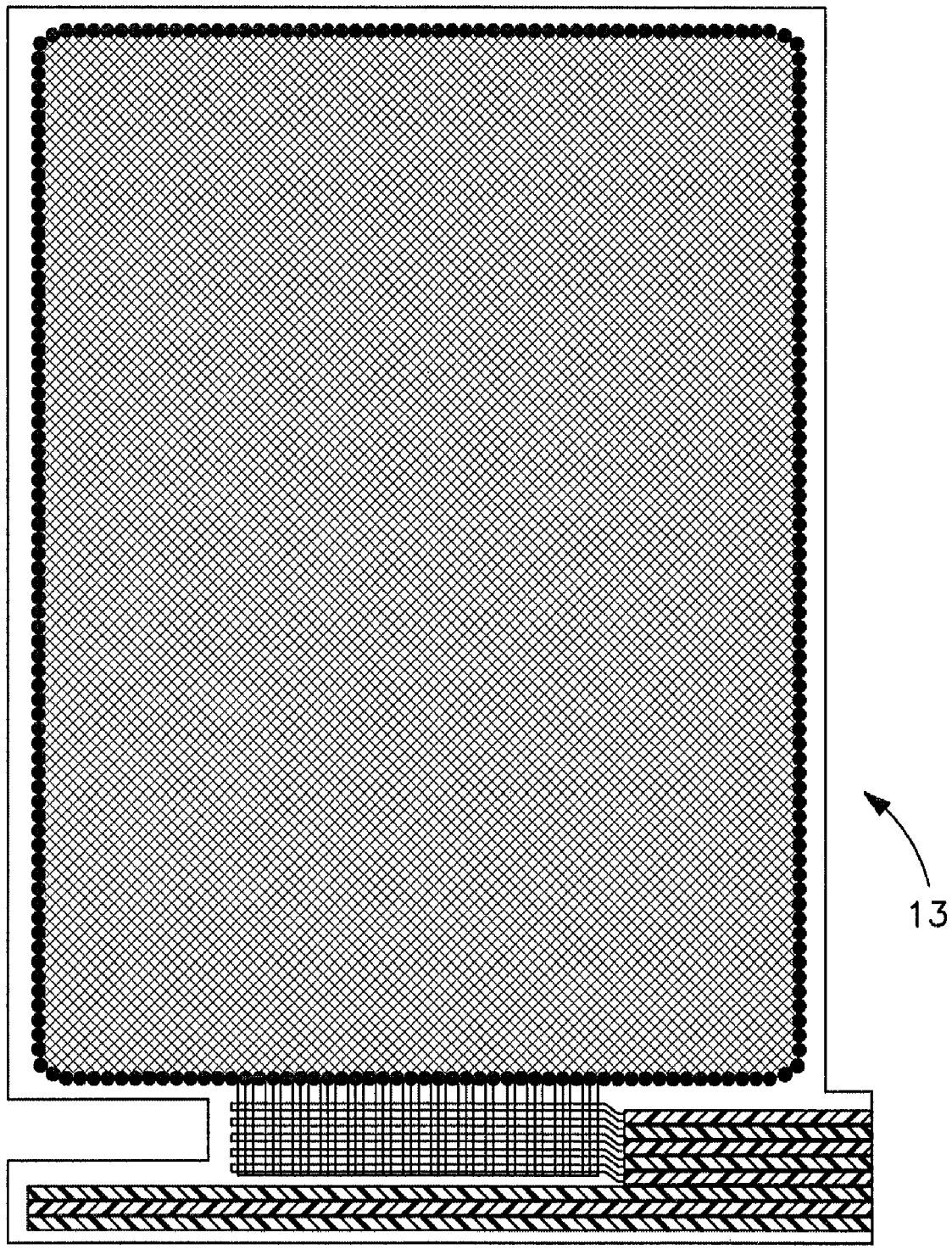
FIG. 3 is a top view of an exemplary sensor used in an exemplary embodiment of the present invention.

In an exemplary embodiment, tamper respondent sensor 13 is initially planar, as illustrated in FIG. 3 of the drawings. Sensor 13 in one embodiment may include a matrix of regular or unpredictable patterned conductive or semi-conductive lines printed onto or otherwise attached to a clear or opaque thin, insulating film. In order to make the unpredictable pattern, the trace herein is manually drawn using computer-aided software packages such as PCB-PADS®, from Mentor Graphics, a printed circuit board layout software program.

Figure 4:
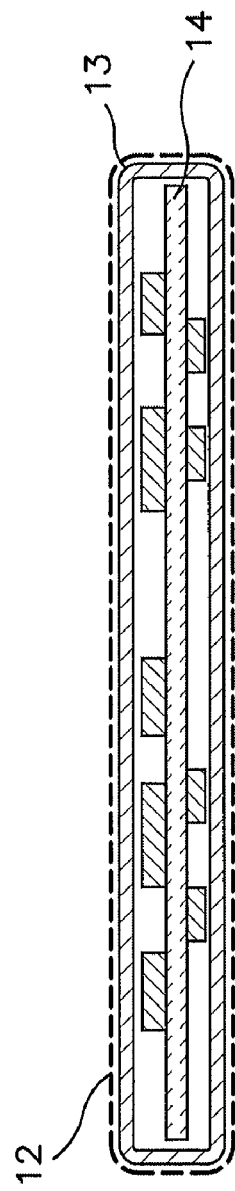
FIG. 4 is a side cross-sectional view of a portion of a tamper respondent system according to an exemplary embodiment of the present invention.

FIG. 4 illustrates porous layer 12 disposed around tamper respondent sensor 13. Preferred properties for porous layer 12 include that it in fact be porous, as defined above, and that it be insulating or at least non-conducting. It is important that porous layer 12 be non-conducting because, by virtue of its attachment to sensor 13 having conductive or semi-conductive tracks on the outer surface thereof, a short circuit with an outer casing 11 (FIG. 5) would be produced if porous layer 12 were conductive. The preferred material for porous layer 12 is polyester, and most preferably spun-bond polyester. Other porous insulating layers may also be used, such as (without limitation) porous polyethylene, porous polypropylene, porous polytetrafluoroethylene (such as expanded polytetrafluoroethylene), porous polycarbonate. Virtually any non-conductive or insulating material may be used, provided it is porous. Preferably, porous layer 12 has a thickness sufficient to ensure electrical isolation between outer casing 11 and sensor 13.

Figure 5:
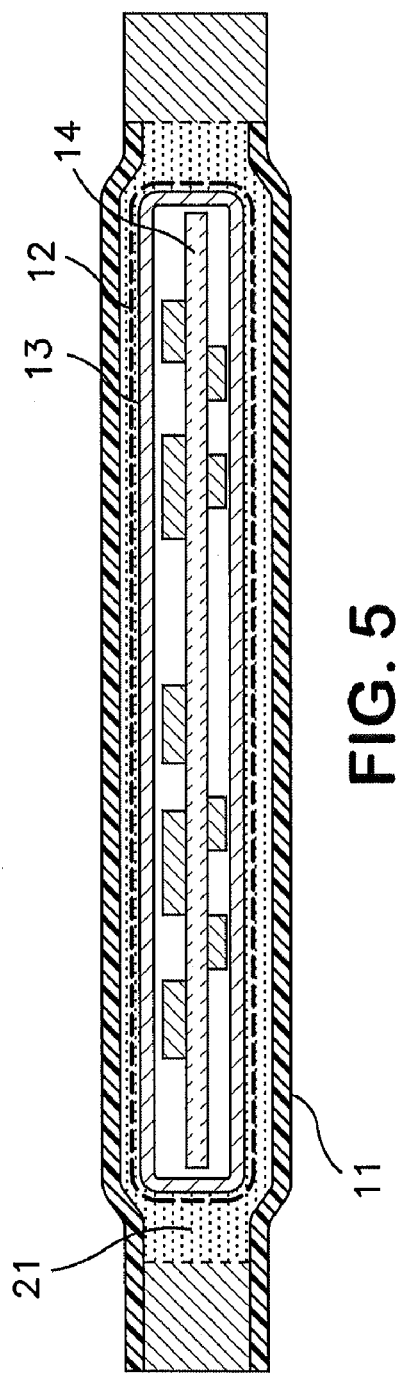
FIG. 5 is a side cross-sectional view of a tamper respondent system according to an exemplary embodiment of the present invention.
Figure 6:
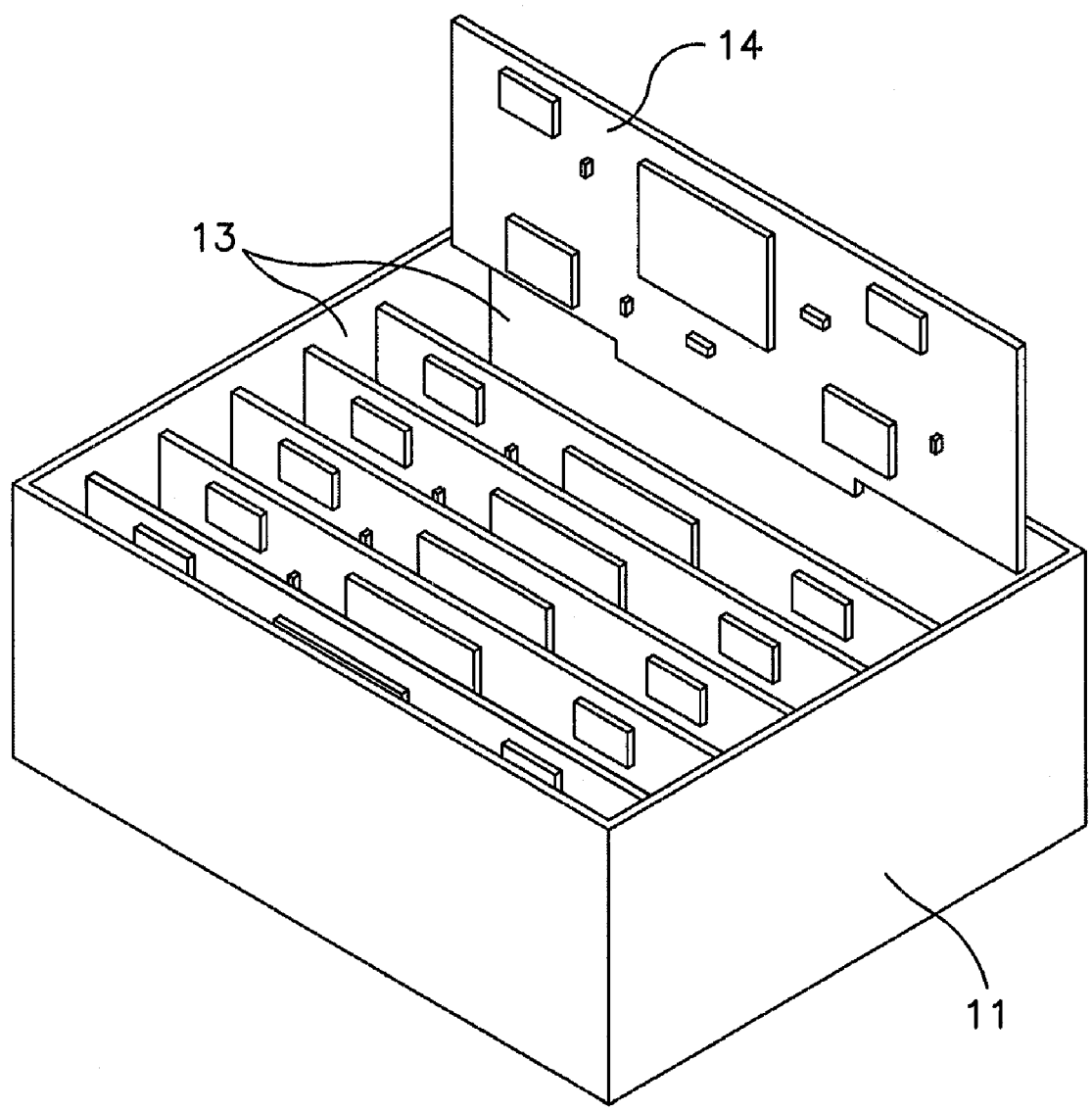
FIG. 6 is an isometric view of a chassis or enclosure with a tamper respondent system applied to each interior wall.
Figure 7:
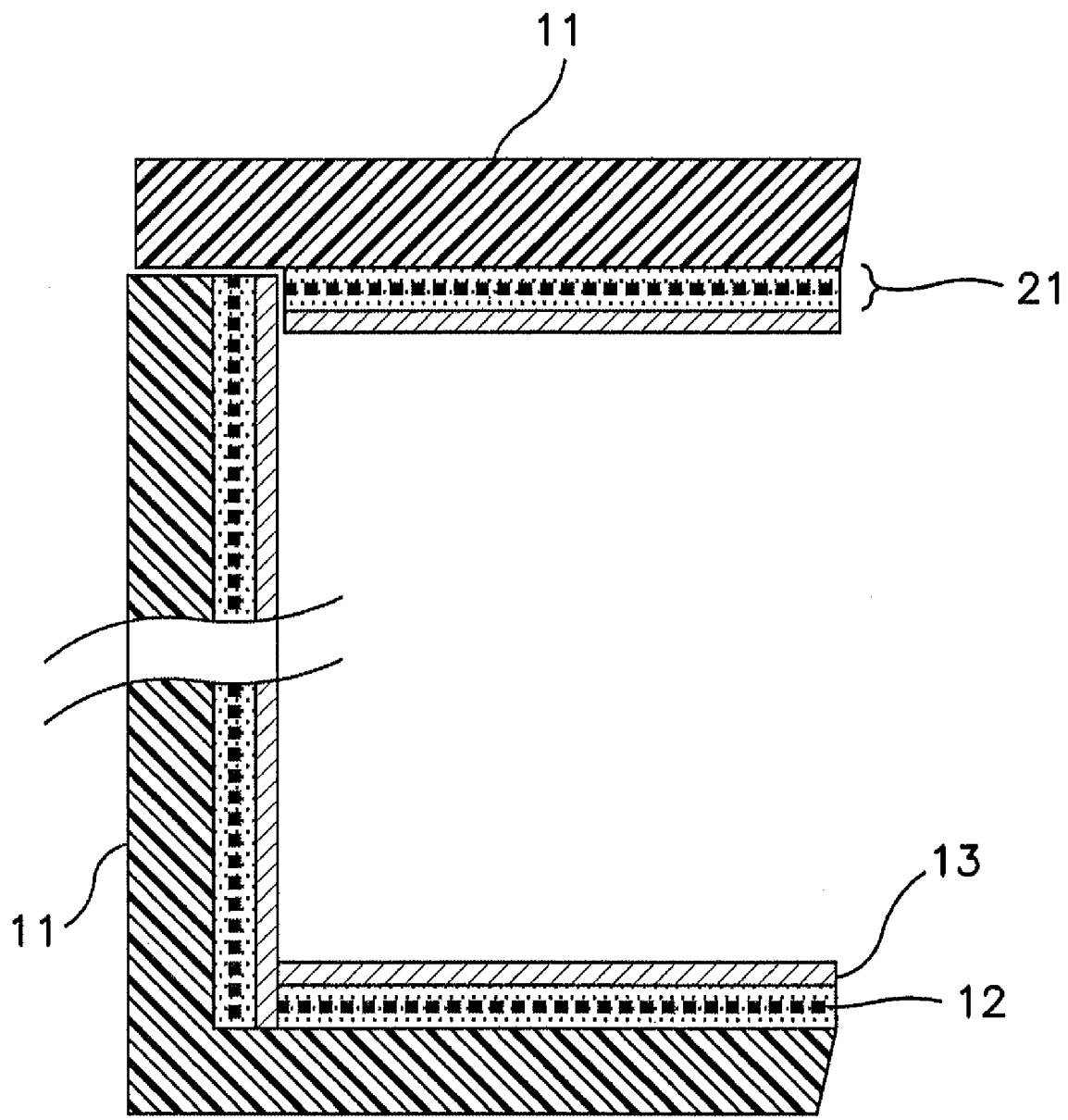
FIG. 7 is a cross-section view of a tamper respondent system as it would be applied to a chassis or enclosure.

FIG. 5 illustrates porous layer 12 is attached to both outer casing 11 and sensor 13 by adhesive 21. Adhesive 21 must penetrate the pores of porous layer 12, such that porous layer 12 is securely attached to both the inner surface of outer casing 11 and sensor 13. In this manner, any attempt to tamper with outer protective casing 11 necessarily results in a breach of porous layer 12 and thus of sensor 13, triggering an electrical state change. Casing 11 can alternatively be a chassis, as depicted in FIG. 6, with sensor 13 including porous insulating layer 12 attached to the inner walls thereof, or other enclosure, as depicted in FIG. 7, where the sensor 13 and porous layer 12 are attached directly to a wall.

Using the porous layer of the present invention as described herein allows a tamper respondent sensor to be disposed inside a protective outer casing around a sensitive electronic device to achieve suitable performance, which was heretofore unachievable. Also, for applications that require tamper respondent protection that have limited space and would require the tamper respondent sensor to be in close proximity to the enclosure, the tamper respondent system of the present invention provides the ability for the sensor to be in very close proximity to the surface of the enclosure, ensures electrical isolation between the sensor and the enclosure, and enables the outer enclosure to be used as an integral part of the security solution.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A tamper respondent system comprising:
   (a) an article to be protected;
   (b) a surface proximate to said article;
   (c) a tamper respondent sensor between said article and said surface, said sensor comprising:
      i. a flexible, dielectric substrate;
      ii. conductive traces on said substrate; and
      iii. a porous insulating layer having pores over said conductive traces;
   (d) an adhesive comprising a combination of epoxy and a pressure sensitive adhesive within said pores of said porous insulating layer,
   (e) wherein said adhesive is in contact with both said substrate and said surface through said porous insulating layer.

2. A tamper respondent system as defined in claim 1 wherein said surface is an at least partially conductive surface.

3. A tamper respondent system as defined in claim 2 wherein said at least partially conductive surface is bonded to said tamper respondent sensor by said adhesive.

4. A tamper respondent system as defined in claim 1 wherein said flexible, dielectric substrate comprises polyethyleneterephthalate ("PET").

5. A tamper respondent system as defined in claim 1 wherein said porous insulating layer comprises polyester.

6. A tamper respondent system as defined in claim 1 wherein said adhesive comprises epoxy.

7. A tamper respondent system as defined in claim 1 wherein said article comprises a Personal Computer Memory Card International Association ("PCMCIA") card.

8. A tamper respondent system as defined in claim 1 wherein said surface comprises part of an enclosure chassis.

9. A tamper respondent system as defined in claim 1 wherein said surface comprises part of a chassis.

* * * * *